United States Patent
Nakamura et al.

(10) Patent No.: US 10,077,491 B2
(45) Date of Patent: *Sep. 18, 2018

(54) HIGH CARBON HOT ROLLED STEEL SHEET AND METHOD FOR MANUFACTURING THE SAME

(71) Applicant: JFE STEEL CORPORATION, Chiyoda-ku, Tokyo (JP)

(72) Inventors: Nobuyuki Nakamura, Fukuyama (JP); Takashi Kobayashi, Kawasaki (JP); Yoshimasa Funakawa, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 956 days.

This patent is subject to a terminal disclaimer.

(21) Appl. No.: 14/370,314

(22) PCT Filed: Dec. 26, 2012

(86) PCT No.: PCT/JP2012/008318
§ 371 (c)(1),
(2) Date: Jul. 2, 2014

(87) PCT Pub. No.: WO2013/102986
PCT Pub. Date: Jul. 11, 2013

(65) Prior Publication Data
US 2015/0090376 A1    Apr. 2, 2015

(30) Foreign Application Priority Data

Jan. 5, 2012  (JP) .................. 2012-000407

(51) Int. Cl.
| | | |
|---|---|---|
| *C22C 38/60* | (2006.01) |
| *C21D 9/46* | (2006.01) |
| *C22C 38/00* | (2006.01) |
| *C22C 38/06* | (2006.01) |
| *C21D 8/02* | (2006.01) |
| *C22C 38/02* | (2006.01) |
| *C22C 38/04* | (2006.01) |
| *C22C 38/18* | (2006.01) |
| *C21D 1/26* | (2006.01) |
| *C22C 38/08* | (2006.01) |
| *C22C 38/12* | (2006.01) |
| *C22C 38/16* | (2006.01) |
| *C22C 38/32* | (2006.01) |
| *C22C 38/54* | (2006.01) |
| *C21D 1/32* | (2006.01) |

(52) U.S. Cl.
CPC ............... *C22C 38/60* (2013.01); *C21D 1/26* (2013.01); *C21D 8/0226* (2013.01); *C21D 8/0263* (2013.01); *C21D 9/46* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/18* (2013.01); *C22C 38/32* (2013.01); *C22C 38/54* (2013.01); *C21D 1/32* (2013.01); *C21D 2211/003* (2013.01); *C21D 2211/005* (2013.01); *Y02P 10/212* (2015.11)

(58) Field of Classification Search
CPC ....... C22C 38/06; C22C 38/001; C22C 38/60; C21D 9/46
USPC .......................................... 148/330
See application file for complete search history.

(56) References Cited

U.S. PATENT DOCUMENTS

| | | | | |
|---|---|---|---|---|
| 5,454,887 A * | 10/1995 | Fukui | .................... | C22C 38/001 148/601 |
| 7,879,163 B2 * | 2/2011 | Nakamura | ............. | C22C 38/001 148/602 |
| 7,909,950 B2 * | 3/2011 | Kimura | .................... | C21D 1/32 148/602 |
| 8,048,237 B2 * | 11/2011 | Kimura | .................... | B21B 3/00 148/320 |

FOREIGN PATENT DOCUMENTS

| | | |
|---|---|---|
| JP | 4-124216 A | 4/1992 |
| JP | 4-311546 A | 11/1992 |
| JP | 05-098356 | 4/1993 |
| JP | 8-120405 A | 5/1996 |
| JP | 2002-309345 A | 10/2002 |
| JP | 2005-097740 A | 4/2005 |
| JP | 4-265582 B2 | 5/2009 |
| JP | 2010-255066 A | 11/2010 |

OTHER PUBLICATIONS

International Search Report dated Mar. 26, 2013, application No. PCT/US2012/008318.
Supplementary European Search Report for Application No. EP 12 86 4620 dated Jul. 6, 2015.

* cited by examiner

Primary Examiner — Weiping Zhu
(74) Attorney, Agent, or Firm — RatnerPrestia

(57) ABSTRACT

A high carbon hot rolled steel sheet and a method for manufacturing the same are provided, wherein excellent cold workability and excellent hardenability are obtained stably. The high carbon hot rolled steel sheet has a composition containing C: 0.20% to 0.48%, Si: 0.1% or less, Mn: 0.5% or less, P: 0.03% or less, S: 0.01% or less, sol. Al: more than 0.10% and 1.0% or less, N: 0.005% or less, B: 0.0005% to 0.0050%, and the remainder composed of Fe and incidental impurities, on a percent by mass basis, and a microstructure composed of ferrite and cementite, wherein the average grain size of the above-described ferrite is 10 to 20 μm and the spheroidization ratio of the above-described cementite is 90% or more.

11 Claims, 1 Drawing Sheet

[Fig. 1]
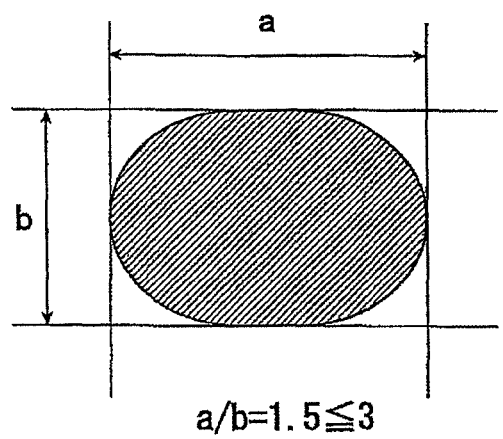
a/b=1.5≦3
[Fig. 2]
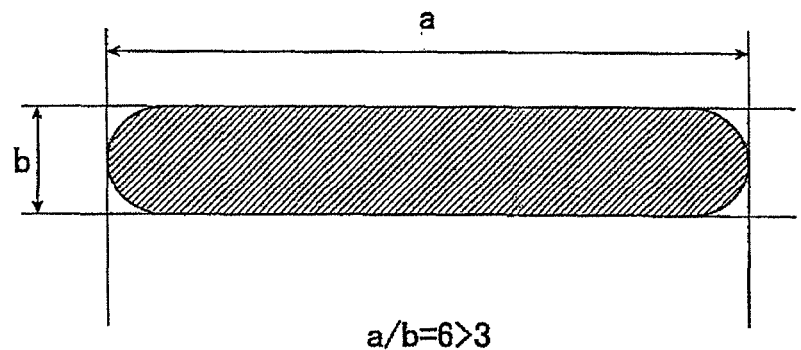
a/b=6>3

HIGH CARBON HOT ROLLED STEEL SHEET AND METHOD FOR MANUFACTURING THE SAME

CROSS REFERENCE TO RELATED APPLICATIONS

This is the U.S. National Phase application of PCT/JP2012/008318, filed Dec. 26, 2012, which claims priority to Japanese Patent Application No. 2012-000407, filed Jan. 5, 2012, the disclosures of each of these applications being incorporated herein by reference in their entireties for all purposes.

FIELD OF THE INVENTION

The present invention relates to a high carbon hot rolled steel sheet having excellent cold workability and hardenability and a method for manufacturing the same.

BACKGROUND OF THE INVENTION

At present, automotive parts, e.g., gears, transmissions, and seat recliners, have been produced by processing hot rolled steel sheets, which are carbon steels for machine structural use specified in JIS G 4051, through cold working into predetermined shapes and applying a hardening treatment to ensure a predetermined hardness. Consequently, a mother hot rolled steel sheet is required to have excellent cold workability and hardenability, and various steel sheets have been proposed previously.

For example, Patent Literature 1 discloses a hot rolled steel sheet having excellent toughness after hardening and containing, as steel components, C: 0.10% to 0.37%, Si: 1% or less, Mn: 1.4% or less, P: 0.1% or less, S: 0.03% or less, sol. Al: 0.01% to 0.1%, N: 0.0005% to 0.0050%, Ti: 0.005% to 0.05%, B: 0.0003% to 0.0050%, and the remainder composed of Fe and incidental impurities, on a percent by mass basis, while $B-(10.8/14)N^*\geq0.0005\%$ and $N^*=N-(14/48)Ti$, where $N^*=0$ when the right side $\leq 0$, are satisfied, wherein the average grain size of TiN which is a precipitate in the steel is 0.06 to 0.30 μm and a prior austenite grain size after hardening is 2 to 25 μm.

Patent Literature 2 discloses a method for manufacturing a Ti-B base high carbon steel sheet without tempering. The steel sheet has excellent cold workability, hardenability, and toughness after a heat treatment and contains C: 0.15% to 0.40%, Si: 0.35% or less, Mn: 0.6% to 1.50%, P: 0.03% or less, S: 0.020% or less, sol. Al: 0.01% to 0.20%, N: 0.0020% to 0.012%, Ti: 0.005% to 0.1%, B: 0.0003% to 0.0030%, and the remainder composed of Fe and incidental impurities, on a percent by mass basis, where $B\ 0.0032-0.014\times sol.\ Al-0.029\times Ti$ is satisfied.

Patent Literature 3 discloses a high carbon hot rolled steel sheet having excellent cold workability, a composition containing C: 0.20% to 0.48%, Si: 0.1% or less, Mn: 0.20% to 0.60%, P: 0.02% or less, S: 0.01% or less, sol. Al: 0.1% or less, N: 0.005% or less, Ti: 0.005% to 0.05%, B: 0.0005% to 0.003%, Cr: 0.05% to 0.3%, and the remainder composed of Fe and incidental impurities, on a percent by mass basis, where $Ti-(48/14)N\geq0.005$ is satisfied, and a microstructure in which a ferrite average grain size is 6 μm or less, carbide average grain size is 0.1 μm or more and less than 1.20 μm, and a volume fraction of ferrite grains substantially not containing carbide is 5% or less.

PATENT LITERATURE

PTL 1: Japanese Patent No. 4265582
PTL 2: Japanese Unexamined Patent Application Publication No. 5-98356
PTL 3: Japanese Unexamined Patent Application Publication No. 2005-97740

SUMMARY OF THE INVENTION

Regarding the high carbon steel sheets described in Patent Literatures 1 to 3, there are problems that the high carbon steel sheet having both of excellent cold workability and excellent hardenability is not produced stably.

It is an object of the present invention to provide a high carbon hot rolled steel sheet and a method for manufacturing the same, wherein excellent cold workability and excellent hardenability are obtained stably.

The present inventors studied on the cold workability and the hardenability of a high carbon hot rolled steel sheet containing B and, as a result, found the following.

i) Excellent cold workability is obtained stably by establishing a microstructure composed of ferrite and cementite, specifying the average grain size of the ferrite to be 10 to 20 μm, and specifying the spheroidization ratio of the cementite to be 90% or more.

ii) An effect of solute B to improve the hardenability can be exerted effectively and excellent hardenability is obtained stably by specifying the amount of sol. Al to be more than 0.10%.

iii) The hardenability improving effect can be exerted effectively and, thereby, the amounts of Si and Mn serving as solution hardening elements can be reduced and stable cold workability is obtained on an as hot rolled basis.

The present invention has been made on the basis of the above-described findings, and provides a high carbon hot rolled steel sheet having a composition containing C: 0.20% to 0.48%, Si: 0.1% or less, Mn: 0.5% or less, P: 0.03% or less, S: 0.01% or less, sol. Al: more than 0.10% and 1.0% or less, N: 0.005% or less, B: 0.0005% to 0.0050%, and the remainder composed of Fe and incidental impurities, on a percent by mass basis, and a microstructure composed of ferrite and cementite, wherein the average grain size of the above-described ferrite is 10 to 20 μm and the spheroidization ratio of the cementite is 90% or more.

It is preferable that the high carbon hot rolled steel sheet according to the present invention further contain 2% or less in total of at least one of Cu and Ni, 1.0% or less in total of at least one of Cr and Mo, and 0.1% or less in total of at least one of Sb and Sn, on a percent by mass basis, together or individually in addition to the above-described composition.

The high carbon hot rolled steel sheet according to the present invention can be produced by rough rolling the steel having the above-described composition, performing finish rolling at a finishing temperature of 850° C. or higher, performing coiling at a coiling temperature of 600° C. or higher, and performing annealing at an annealing temperature of 680° C. or higher and the $Ac_1$ transformation temperature or lower.

According to the present invention, a high carbon hot rolled steel sheet can be produced, wherein excellent cold workability and excellent hardenability are obtained stably. The high carbon hot rolled steel sheet according to the present invention is suitable for automotive gears, transmissions, seat recliners, and the like.

BRIEF DESCRIPTION OF THE DRAWINGS

FIG. 1 is a diagram showing the maximum grain size a and the minimum grain size b of cementite, where a/b≤3 and a/b=1.5.

FIG. 2 is a diagram showing the maximum grain size a and the minimum grain size b of cementite, where a/b>3 and a/b=6.

DETAILED DESCRIPTION OF EMBODIMENTS OF THE INVENTION

A high carbon hot rolled steel sheet and a method for manufacturing the same according to embodiments of the present invention will be described below in detail. In this regard, the term "%" which is the unit of the content of component refers to "percent by mass" unless otherwise specified.

1) Composition

C: 0.20% to 0.48%

Carbon is an element important for obtaining the strength after hardening. It is necessary that the amount of C is at least 0.20% or more so that cold forming into a part is performed and, thereafter, a predetermined hardness is obtained by a heat treatment. However, if the amount of C is more than 0.48%, the cold workability is degraded because of becoming hard. Therefore, the amount of C is specified to be 0.20% to 0.48%. In order to obtain sufficient hardness after the heat treatment, the amount of C is specified to be preferably 0.26% or more.

Si: 0.1% or less

Silicon is an element to enhance strength on the basis of solution hardening. However, if the amount of Si is more than 0.1%, the cold workability is degraded because of becoming hard. Therefore, the amount of Si is specified to be 0.1% or less. The amount of Si may be zero with no problem.

Mn: 0.5% or less

Manganese is an element to enhance strength on the basis of solution hardening. However, if the amount of Mn is more than 0.5%, the cold workability is degraded because of becoming hard and formation of a band structure resulting from segregation. Therefore, the amount of Mn is specified to be 0.5% or less, and preferably 0.4% or less. The amount of Mn may be zero with no problem, although the amount of Mn is specified to be preferably 0.2% or more because if Mn is reduced, graphite is precipitated easily.

P: 0.03% or less

Phosphorus is an element to enhance strength on the basis of solution hardening. However, if the amount of P is more than 0.03%, the toughness after hardening is degraded because grain boundary embrittlement is caused. Therefore, the amount of P is specified to be 0.03% or less. In order to obtain excellent toughness after hardening, the amount of P is specified to be preferably 0.02% or less. The amount of P may be zero with no problem, although the amount of P is specified to be preferably 0.005% or more in consideration of the cost because excessive reduction increases the production cost.

S: 0.01% or less

Sulfur forms sulfides and degrades the cold workability and the toughness after hardening and, therefore, is an element to be reduced. If the amount of S is more than 0.01%, the cold workability and the toughness after hardening are degraded significantly. Consequently, the amount of S is specified to be 0.01% or less. In order to obtain excellent cold workability and toughness after hardening, the amount of S is specified to be preferably 0.005% or less. The amount of S may be zero with no problem.

Sol. Al: more than 0.10% and 1.0% or less

Soluble Al facilitates spheroidization of cementite and improves the cold workability. However, in the case of a steel containing B, if the amount of sol. Al is 0.10% or less, in carburizing and quenching or bright quenching, BN is formed easily when heating is performed in an atmosphere gas containing a $N_2$ gas mixed to control the C potential, solute B to improve the hardenability may be reduced, and the hardenability of the surface layer portion of a steel sheet may be degraded significantly. If the amount of sol. Al is specified to be more than 0.10%, AlN is formed preferentially and formation of BN is suppressed, so that although austenite grains are made fine because of formation of AlN, the amount of solute B is ensured and, thereby, the hardenability can be exerted stably. On the other hand, if the amount of sol. Al is more than 1.0%, the cold workability is degraded because of becoming excessively hard due to solution hardening.

N: 0.005% or less

If the amount of N is more than 0.005%, the amount of solute B is reduced because of formation of BN in heating of the hardening treatment, and austenite grains are made fine excessively because of formation of large amounts of BN and AlN, formation of ferrite is facilitated in cooling, and the toughness after hardening is degraded. Consequently, the amount of N is specified to be 0.005% or less. The amount of N may be zero with no problem.

B: 0.0005% to 0.0050%

Boron is an important element to enhance the hardenability. However, if the amount of B is less than 0.0005%, a sufficient hardenability enhancing effect is not observed. On the other hand, if the amount of B is more than 0.0050%, a load of hot rolling increases, the operability is degraded, and degradation in the cold workability is caused. Consequently, the amount of B is specified to be 0.0005% to 0.0050%.

The remainder is composed of Fe and incidental impurities. In order to facilitate spheroidization of cementite and further improve the cold workability and the hardenability, it is preferable that 2% or less in total of at least one of Cu and Ni, 1.0% or less in total of at least one of Cr and Mo, and 0.1% or less in total of at least one of Sb and Sn be contained together or individually. Meanwhile, an effect of Sb and Sn to improve the hardenability by suppressing nitriding of B, as with the above-described sol. Al, was newly ascertained. Therefore, for the purpose of improving the hardenability more reliably, it is particularly preferable that these elements be added.

2) Microstructure

In order to stably obtain excellent cold workability, it is necessary that a microstructure composed of ferrite and cementite be established, the average grain size of the ferrite is specified to be 10 to 20 μm, and the spheroidization ratio of the cementite is specified to be 90% or more. This is because if the average grain size of the ferrite is less than 10 μm, the steel sheet becomes hard, and if the average grain size of the ferrite is more than 20 μm or the spheroidization ratio of the cementite is less than 90%, the ductility is reduced in spite of becoming mild, so that the cold workability is degraded.

Here, the average grain size of the ferrite was determined by polishing a sheet thickness cross-section in the rolling direction of the steel sheet, performing corrosion with nital, observing 10 places in the vicinity of the sheet thickness central portion by using a scanning electron microscope at a magnification of 1,000 times, determining the average grain size of the ferrite at each place by a cutting method in conformity with JIS G0552: 1998, and further averaging the average grain sizes of the 10 places. In this regard, the phase configuration of the microstructure can also be examined at the same time with this.

Meanwhile, in the above-described microstructure observation, the ratio a/b of the maximum grain size a to the minimum grain size b of each cementite was calculated, and the proportion (%) of the number of grains of the cementite having the above-described ratio of 3 or less to the whole number of grains of the cementite was determined and taken as the spheroidization ratio of the cementite. For example, the maximum grain size a and the minimum grain size b can be determined as shown in FIGS. 1 and 2.

3) Production Condition

Finishing temperature: 850° C. or higher

The high carbon hot rolled steel sheet is made into a steel sheet having a predetermined sheet thickness by subjecting the steel having the above-described composition to hot rolling composed of rough rolling and finish rolling. At this time, if the finishing temperature is lower than 850° C., austenite grains become fine, so that the average grain size of the ferrite formed in the cooling process performed thereafter becomes less than 10 µm. Therefore, the finishing temperature is specified to be 850° C. or higher. In this regard, the upper limit of the finishing temperature is not specifically limited. However, if excessively high, the microstructure becomes uneven and variations in the hardenability may occur easily. Consequently, the upper limit is specified to be preferably 1,000° C.

Coiling temperature: 600° C. or higher

If the coiling temperature is lower than 600° C., the average grain size of the ferrite becomes less than 10 µm. Therefore, the coiling temperature is specified to be 600° C. or higher. In this regard, the upper limit of the coiling temperature is not specifically limited. However, in order to avoid degradation in surface quality due to scales, the upper limit is specified to be preferably 750° C.

Annealing temperature: 680° C. or higher and $Ac_1$ transformation point or lower It is necessary that the steel sheet after coiling be subjected to pickling and annealing at an annealing temperature of 680° C. or higher and the $Ac_1$ transformation temperature or lower in order that pearlite is not allowed to be generated, a microstructure composed of ferrite and cementite be established, and the spheroidization ratio of the cementite is specified to be 90% or more. If the annealing temperature is lower than 680° C., it is not possible to make the spheroidization ratio of the cementite 90% or more, and if the $Ac_1$ transformation temperature is exceeded, austenite is generated in the heating, pearlite is generated in the cooling, and the cold workability is degraded. Meanwhile, the annealing time in which the above-described temperature is maintained is preferably 20 hours or more and 40 hours or less. The annealing time is preferably 20 hours or more because the spheroidization ratio of the cementite is adjusted within a predetermined range easily and is preferably 40 hours or less because the effect of annealing is obtained sufficiently and, in addition, an increase in production cost due to a long time of execution of annealing is suppressed.

Meanwhile, the $Ac_1$ transformation temperature can be determined from, for example, a changing point of a thermal expansion curve determined on the basis of a formastor experiment at a heating rate of 100° C./hr.

In order to make the high carbon steel sheet according to the present invention, either a converter or an electric furnace can be used. The thus melted high carbon steel is made into a slab by ingot rolling or continuous casting. The slab is usually heated and, thereafter, is hot-rolled. In this regard, in the case of the slab produced by continuous casting, direct rolling may be applied, where rolling is performed on an as-is basis or while heat is retained to suppress a decrease in temperature. Also, in the case where the slab is heated and is hot-rolled, the slab heating temperature is specified to be preferably 1,280° C. or lower to avoid degradation in the surface state due to scales. In the hot rolling, the member to be rolled may be heated by a heating device, e.g., a sheet bar heater, during the hot rolling in order to ensure the finish rolling temperature.

EXAMPLES

Hot rolled annealed sheets (Steel sheet Nos. 1 to 18) having a sheet thickness of 4.0 mm were produced by melting high carbon steels having the compositions of Steel Nos. A to O shown in Table 1, performing hot rolling under the hot rolling conditions shown in Table 2, performing pickling, and performing annealing at annealing temperatures shown in Table 2.

The phase configurations of the microstructure, the average grain sizes of the ferrite, and the spheroidization ratios of the cementite of the thus produced steel sheets were determined by the above-described methods. Meanwhile, a JIS No. 5 tensile test piece was taken in a direction parallel to the rolling direction. The tensile strength and the elongation were determined in conformity with JIS Z 2201. Furthermore, the hardenability was evaluated by the method described below.

Hardenability: A flat plate test piece (width 50 mm×length 50 mm) was taken from the steel sheet, and was heated and held at 900° C. for 1 hour in an atmosphere in which a carbon potential was controlled to become equal to the amount of C in the steel by mixing an RX gas and the air. A hardening test was immediately performed by a controlled atmosphere hardening method in which the test piece was put into an oil at 50° C. and the oil was agitated, so that the Rockwell hardness ($H_{RC}$) was measured. Then, in accordance with the amount of C in the steel, the hardenability was evaluated as excellent when $H_{RC} \geq 42$ at C: 0.20%, $H_{RC} \geq 54$ at C: 0.35%, and $H_{RC} \geq 58$ at C: 0.48%.

The results are shown in Table 2.

It is clear that the steel sheet in the invention example has a microstructure composed of ferrite and cementite, the average grain size of the ferrite is 10 to 20 µm, the spheroidization ratio of the cementite is 90% or more, the elongation is large to exhibit excellent cold workability and, in addition, excellent hardenability is exhibited because sufficient hardness is obtained in accordance with the amount of C after hardening.

TABLE 1

(percent by mass)

| Steel. No | C | Si | Mn | P | S | sol. Al | N | B | Others | Ac₁ transformation point (° C.) | Remarks |
|---|---|---|---|---|---|---|---|---|---|---|---|
| A | 0.20 | 0.02 | 0.50 | 0.02 | 0.01 | 0.20 | 0.0033 | 0.003 | Cr: 0.1 | 719 | Inventive steel |
| B | 0.35 | 0.02 | 0.30 | 0.02 | 0.01 | 0.11 | 0.0033 | 0.003 | — | 723 | Inventive steel |
| C | 0.35 | 0.02 | 0.30 | 0.02 | 0.01 | 1.00 | 0.0033 | 0.003 | Cr: 0.2, Ni: 0.5 | 718 | Inventive steel |
| D | 0.35 | 0.02 | 0.30 | 0.02 | 0.01 | 0.11 | 0.0033 | 0.003 | Cu: 0.5, Mo: 0.2 | 723 | Inventive steel |
| E | 0.48 | 0.02 | 0.20 | 0.02 | 0.01 | 0.40 | 0.0033 | 0.003 | Cr: 0.5 | 731 | Inventive steel |
| F | 0.35 | 0.02 | 0.30 | 0.02 | 0.01 | 1.00 | 0.0033 | 0.003 | Sb: 0.02, Sn: 0.04 | 723 | Inventive steel |
| G | 0.20 | 0.2 | 0.75 | 0.02 | 0.01 | 0.03 | 0.0033 | 0.003 | — | 728 | Comparative steel |
| H | 0.35 | 0.2 | 0.75 | 0.02 | 0.01 | 0.03 | 0.0033 | 0.003 | — | 728 | Comparative steel |
| I | 0.48 | 0.2 | 0.75 | 0.02 | 0.01 | 0.03 | 0.0033 | 0.003 | — | 728 | Comparative steel |
| J | 0.35 | 0.02 | 0.30 | 0.02 | 0.01 | 0.07 | 0.0033 | 0.003 | — | 720 | Comparative steel |
| K | 0.48 | 0.02 | 0.20 | 0.02 | 0.01 | 0.07 | 0.0033 | 0.003 | Cr: 0.05 | 722 | Comparative steel |
| L | 0.35 | 0.02 | 0.30 | 0.02 | 0.01 | 0.11 | 0.0033 | 0.003 | Sb: 0.01, Sn: 0.04 | 720 | Inventive steel |
| M | 0.35 | 0.02 | 0.75 | 0.02 | 0.01 | 0.11 | 0.0033 | 0.003 | — | 715 | Comparative steel |
| N | 0.35 | 0.2 | 0.50 | 0.02 | 0.01 | 0.11 | 0.0033 | 0.003 | — | 723 | Comparative steel |
| O | 0.35 | 0.02 | 0.30 | 0.02 | 0.01 | 1.00 | 0.0033 | 0.003 | Ni: 0.5 | 715 | Inventive steel |

TABLE 2

| Steel sheet No. | Steel No. | Hot rolling condition | | | Phase configuration* | Average grain size of F (μm) | Spheroidization ratio of C (%) | Tensile strength (MPa) | Elongation (%) | Hardness after controlled atmosphere hardening ($H_{RC}$) | Remarks |
|---|---|---|---|---|---|---|---|---|---|---|---|
| | | Finishing temperature (° C.) | Coiling temperature (° C.) | Annealing temperature (° C.) | | | | | | | |
| 1 | A | 890 | 660 | 680 | F + C | 20 | 95 | 340 | 54 | 43 | Invention example |
| 2 | B | 880 | 650 | 700 | F + C | 15 | 93 | 380 | 46 | 56 | Invention example |
| 3 | B | 810 | 600 | 680 | F + C | 6 | 94 | 510 | 37 | 55 | Comparative example |
| 4 | B | 850 | 500 | 680 | F + C | 8 | 95 | 490 | 38 | 56 | Comparative example |
| 5 | B | 880 | 680 | 640 | F + C | 22 | 80 | 340 | 39 | 56 | Comparative example |
| 6 | C | 880 | 650 | 700 | F + C | 13 | 95 | 410 | 45 | 55 | Invention example |
| 7 | D | 880 | 650 | 700 | F + C | 14 | 95 | 440 | 43 | 55 | Invention example |
| 8 | E | 880 | 650 | 700 | F + C | 12 | 90 | 390 | 44 | 59 | Invention example |
| 9 | F | 880 | 650 | 700 | F + C | 15 | 94 | 382 | 47 | 57 | Invention example |
| 10 | G | 880 | 650 | 700 | F + C | 18 | 87 | 430 | 46 | 38 | Comparative example |
| 11 | H | 880 | 650 | 700 | F + C | 13 | 85 | 490 | 38 | 50 | Comparative example |
| 12 | I | 880 | 650 | 700 | F + C | 10 | 80 | 540 | 30 | 54 | Comparative example |
| 13 | J | 880 | 650 | 700 | F + C | 12 | 90 | 480 | 45 | 53 | Comparative example |
| 14 | K | 880 | 650 | 700 | F + C | 13 | 91 | 500 | 47 | 56 | Comparative example |
| 15 | L | 880 | 650 | 700 | F + C | 11 | 95 | 380 | 44 | 55 | Invention example |
| 16 | M | 880 | 650 | 700 | F + C | 12 | 85 | 460 | 43 | 51 | Comparative example |
| 17 | N | 880 | 650 | 700 | F + C | 11 | 81 | 470 | 42 | 50 | Comparative example |
| 18 | O | 880 | 650 | 700 | F + C | 13 | 94 | 400 | 46 | 55 | Invention example |

*F ferrite, C cementite

The invention claimed is:

1. A high carbon hot rolled steel sheet comprising a composition containing C: 0. 20% to 0.48%, Si: 0.1% or less, Mn: 0.5% or less, P: 0.03% or less, S: 0.01% or less, sol. Al: more than 0.10% and 1.0% or less, N: 0.005% or less, B: 0.0005% to 0.0050%, and the remainder composed of Fe and incidental impurities, on a percent by mass basis, and a microstructure composed of ferrite and cementite, wherein the average grain size of the ferrite is 10 to 20 μm and the spheroidization ratio of the cementite is 90% or more.

2. The high carbon hot rolled steel sheet according to claim 1, further containing 2% or less in total of at least one of Cu and Ni on a percent by mass basis.

3. The high carbon hot rolled steel sheet according to claim 1, further containing 1.0% or less in total of at least one of Cr and Mo on a percent by mass basis.

4. The high carbon hot rolled steel sheet according to claim 1, further containing 0.1% or less in total of at least one of Sb and Sn on a percent by mass basis.

5. A method for manufacturing a high carbon hot rolled steel sheet, the method comprising the steps of rough rolling the steel having the composition according to claim 1, performing finish rolling at a finishing temperature of 850° C. or higher, performing coiling at a coiling temperature of 600° C. or higher, and performing annealing at an annealing temperature of 680° C. or higher and the $Ac_1$ transformation point or lower.

6. The high carbon hot rolled steel sheet according to claim 2, further containing 1.0% or less in total of at least one of Cr and Mo on a percent by mass basis.

7. The high carbon hot rolled steel sheet according to claim 2, further containing 0.1% or less in total of at least one of Sb and Sn on a percent by mass basis.

8. The high carbon hot rolled steel sheet according to claim 3, further containing 0.1% or less in total of at least one of Sb and Sn on a percent by mass basis.

9. A method for manufacturing a high carbon hot rolled steel sheet, the method comprising the steps of rough rolling the steel having the composition according to claim 2, performing finish rolling at a finishing temperature of 850° C. or higher, performing coiling at a coiling temperature of 600° C. or higher, and performing annealing at an annealing temperature of 680° C. or higher and the $Ac_1$ transformation point or lower.

10. A method for manufacturing a high carbon hot rolled steel sheet, the method comprising the steps of rough rolling the steel having the composition according to claim 3, performing finish rolling at a finishing temperature of 850° C. or higher, performing coiling at a coiling temperature of 600° C. or higher, and performing annealing at an annealing temperature of 680° C. or higher and the $Ac_1$ transformation point or lower.

11. A method for manufacturing a high carbon hot rolled steel sheet, the method comprising the steps of rough rolling the steel having the composition according to claim 4, performing finish rolling at a finishing temperature of 850° C. or higher, performing coiling at a coiling temperature of 600° C. or higher, and performing annealing at an annealing temperature of 680° C. or higher and the $Ac_1$ transformation point or lower.

* * * * *